United States Patent [19]

Pfohl

[11] Patent Number: 5,003,066
[45] Date of Patent: Mar. 26, 1991

[54] PROCESS FOR THE PREPARATION OF POLYGLYCIDAMIDES

[75] Inventor: William F. Pfohl, Wilbraham, Mass.

[73] Assignee: Monsanto Company, St. Louis, Mo.

[21] Appl. No.: 330,333

[22] Filed: Mar. 29, 1989

Related U.S. Application Data

[62] Division of Ser. No. 606,030, May 2, 1984, Pat. No. 4,861,881.

[51] Int. Cl.$^5$ ................. C07D 251/54; C07D 403/02; C07D 239/70
[52] U.S. Cl. .................................... 544/198; 544/196; 544/197; 544/200; 544/204; 544/205; 544/206; 544/207; 544/208; 544/209; 544/256; 548/304
[58] Field of Search ............... 544/196, 204, 205, 206, 544/207, 208, 209, 256, 200, 197, 198; 548/304

[56] References Cited

U.S. PATENT DOCUMENTS 3,145,207 8/1964 Wohnsiedler ..................... 544/196
3,793,321 2/1974 Habermeier ........................ 544/196

Primary Examiner—Anton H. Sutto
Assistant Examiner—J. Richter
Attorney, Agent, or Firm—R. Bruce Blance; Wm. J. Farrington; Linda L. Lewis

[57] ABSTRACT

The polyglycidamides are epoxy derivatives of cyclic ureas such as glycouril and aminotriazines such as melamine and guanamines. They are prepared from cyclic ureas and aminotriazines by methylolating with formaldehyde, etherifying with an alcohol, transetheramidizing with acrylamide and epoxidizing with hydrogen peroxide. They are used with polyamines and other epoxy reactive oligomers to provide crosslinkable coating systems which posses solvent, chemical and water resistance and UV stability.

3 Claims, No Drawings

PROCESS FOR THE PREPARATION OF POLYGLYCIDAMIDES

This is a division of application Ser. No. 06/606,030, filed May 2, 1984, now U.S. Pat. No. 4,861,881.

This invention relates to epoxides and to a process for preparing such epoxides. More particularly, it relates to epoxidized polyunsaturated amides and triazines and to a process of preparing such epoxidized polyunsaturated amides and triazines.

Epoxy resins are used widely as components of crosslinkable surface coatings, potting and laminating resins. The crosslinkable systems contain limited amounts of solvent and generate limited amounts of volatile compounds when they are applied as coatings. Also, since they can be cured at relatively low temperature, the systems require little energy for cure. Thus their environmental impact is favorable in comparison with many other conventional coating systems.

The common epoxy systems contain aromatic epoxies and aromatic and aliphatic amines. Such aromatic epoxy amine systems cure well but have poor UV stability. Coatings made from them chalk and yellow. In addition, the systems react relatively sluggishly and have high viscosity. Aliphatic epoxy amine systems have good UV stability but are even slower in rate of cure, remaining wet for extended periods after they have been applied as coatings. Epoxy alkyloxy methylamino-s-triazines are described in U.S. Pat. No. 3,145,207. These epoxies provide systems with a slow cure rate and poor water resistance. Triglycidyl isocyanurates are more reactive than aromatic epoxies and provide systems which have improved UV stability. However they have a limited range of solubility which restricts their use in coating, potting and laminating systems.

I have now discovered a class of epoxy compounds, namely polyglycidamides which may be blended with polyamines and other epoxy reactive oligomers to provide crosslinkable systems. When the systems are cured they are tough and abrasion resistant, possess solvent, chemical and water resistance and UV stability and can be applied as coatings to provide corrosion resistance to metallic substrates and can be used in potting and laminating applications.

The polyglycidamide composition of the present invention are depicted by the following structural formula:

$$Y(R)_m$$

wherein Y is a nucleus selected from the group consisting of:

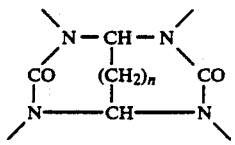

1.

-continued

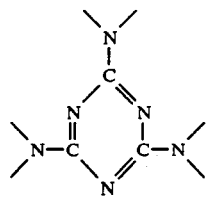

2.

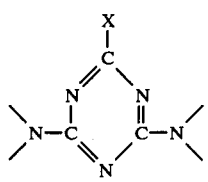

3.

and

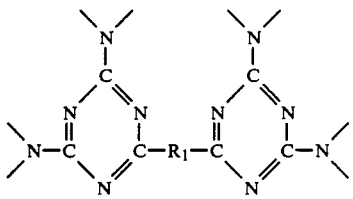

4.

wherein R is selected from the group consisting of:

$(CH_2O)_p R_2;$  A.

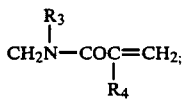  B.

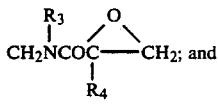  C.

$(CH_2O)_q CH_2 R_5$  D.

wherein $R_1$ is a $C_1$ to $C_{10}$, linear or branched or cyclic, saturated or unsaturated or epoxidized, divalent hydrocarbyl radical; wherein $R_2$ is H, or a $C_1$ to $C_{10}$, linear or branched or cyclic, saturated or unsaturated or epoxidized, aliphatic or aromatic monovalent hydrocarbyl radical but not more than one $R_2$ per Y nucleus is H; wherein $R_3$ and $R_4$ are individually selected form hydrogen and methyl; wherein $R_5$ is $[Y(R)_{m-2}-(CH_2O)_r-CH_2]_s-Y(R)_{m-1};$ wherein X is $R_2$ as defined hereinabove; wherein m is the equivalence of the Y nucleus and is in the range of 4 to 8; wherein n, p, q and r are individually in the range of 0 to 1; wherein the average s is in the range of 0 to 2; wherein the average number of A groups per Y nucleus is in the range of 1 to m−1, the average number of B groups per Y nucleus is in the range of 0 to m−2, the average number of C groups per Y nucleus is in the range of 1 to m−1 and wherein the average number of Y nuclei per molecule is in the range of about 1 to about 4 and the average number of C groups per molecule is in the range of about 1 2 to about 10. Preferably the average number of C groups per molecule is in the range of about 2 to about 6.

Suitable Y nuclei are provided by melamine, N-alkyl melamines such as N, N',N"-trimethyl melamine, guanamines such as acetoguanamire, benzoguanamine, glutaro guanamine, and adipoguanamine, and cyclic ureas such as glycouril (the condensation product of glyoxal and urea), and the condensation product of malonaldehyde and urea.

The polyglycidamide of this invention can be prepared by methylolating cyclic ureas and aminotriazines with formaldehyde, etherifying with a $C_1$ to $C_{10}$ alcohol, such as methanol, ethanol, propanol, butanol, or 2-ethyl-1-hexanol, transetheramidizing with an alpha, beta-unsaturated amide such as acrylamide and epoxidizing with a peroxide, such as hydrogen peroxide in the presence of a coreactive nitrile such as acetonitrile. If $R_1$ or $R_2$ is an ethylenically unsaturated radical, some epoxidation of the double bond occurs.

The preferred polyglycidamides are oligomeric mixtures, in which Y is a melamine nucleus, the A group is $CH_2OR_2$ or H, $R_2$ being methyl, butyl or 2-ethylhexyl, the B group is $CH_2NHCOCH=CH_2$ and the C group is

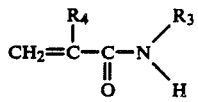

there being on average 0 to 1 H groups, 1 to 3 $CH_2OR_2$ groups, 0 to 1 B groups and 2 to 3 C groups, per melamine nucleus and the average number of melamine nuclei per molecule being in the range of about 1 to about 3.

In a preferred procedure of the present invention an unsaturated condensate is obtained by condensation of a $C_1$ to $C_4$ alkoxymethylmelamine with the appropriate amount of acrylamide and a $C_5$ to $C_{10}$ alcohol to obtain about 2.5 to 3.0 amide groups and about 1.0 $C_5$ to $C_{10}$ alkoxy groups per nucleus. The $C_1$ to $C_4$ alkoxymethylmelamine preferably contains at least about five alkoxymethyl groups per melamine ring and is obtained by reaction of formaldehyde and melamine and etherification of the methylolmelamine product under conditions well known in the art to minimize the amount of oligomerization which can occur by formation of methylene or methylene ether bridges. The average degree of oligomerization is preferably less than about 2 and preferably the etherified methylolmelamine is the substantially fully etherified and fully methylolated melamine with a degree of methylolation of about 5 to 6 and a degree of etherification of at least about 5.

The acrylamide which is used in the condensation can be represented by the formula:

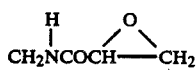

where $R_3$ and $R_4$ are as defined hereinabove. The preferred acrylamide is acrylamide in which $R_3$ and $R_4$ are both hydrogen 3.4.

The condensation reaction is carried out in the presence of a catalytic amount of an acid catalyst selected from the group consisting of protonic acids of pKa less than about 2 and Lewis acids To prevent polymerization or oxidation of the unsaturated melamine condensate and the acrylamide during the condensation reaction, a polymerization and oxidation inhibiting quantity of an inhibitor is added to the reaction mixture. Excess of inhibitor should be avoided since it can cause color development. Effective inhibitors include hydroquinone, ethers of hydroquinone, and quinone.

Epoxidation is preferably effected with a mixture of hydrogen peroxide and a nitrile of the formula $R_6-C\equiv N$ in a mole ratio of about 1:1 or peroxycarboximidic acid of the formula

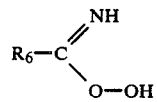

wherein $R_6$ denotes either a saturated alkyl, cycloalkyl or aryl radical. The peroxycarboximidic acid is presumed to be formed in situ when a mixture of hydrogen peroxide and a nitrile is used. Suitable nitriles for the epoxidation include, but are not limited to acetonitrile, adiponitrile, or benzonitrile.

Advantageously, the epoxidation with hydrogen peroxide and a nitrile is carried out under alkaline conditions, in the pH range of 7.5 to about 10.5. A preferred pH range is about 8.5 to about 9.5. The reaction temperature may be in the range of about 30 to about 65° C., preferably 55 to 65° C. Advantageously the epoxidation is carried out with an excess of hydrogen peroxide up to 2.5 equivalents based on the unsaturated amide groups and with a ratio of about 3 to about 5 equivalents of nitrile per equivalent of hydrogen peroxide. If there are ethylenically unsaturated groups in addition to the amide unsaturation they may also be epoxidized. The excess is preferably in the range of 2.0 to 2.5 equivalents.

Other methods of epoxidation include the use of other oxidizing agents such as peroxyacids formed by the reaction of the oxides of transition metals of groups IVB, VB and VIB, oxides of arsenic and boron, or tungstic and molybdic acid with hydrogen peroxide at a pH of 4–6.

Peracids may also be used to effect epoxidation. The peracids, which are aliphatic or aromatic, are formed in situ or are pre-formed and include performic acid, peracetic acid, perbenzoic acid and trichloroperacetic acid. They may be pre-formed by the reaction of a carboxylic acid with hydrogen peroxide in the presence of a strong acid catalyst such as sulfuric acids or sulfonic acids. Sulfonic acid cation exchange resins can also be used as the strong acid catalyst.

The following examples are for illustration only and are not intended to limit the scope of the invention. All the parts and percentages are by weight unless otherwise indicated.

EXAMPLE 1

The following examples are for illustration only and are not intended to limit the scope of the invention. All the parts and percentages are by weight unless otherwise indicated.

EXAMPLE 1

This example describes the preparation of a polyglycidamide or epoxy melamine from a mixed methyl butyl etherified methylolmelamine.

460 parts of a mixed methyl butyl etherified methylolmelamine (melamine:formaldehyde:methanol:butanol of a ratio of 1:5.5:2.9:2.1), 183.3 (2.5 mol) parts of acrylamide and 0.09 parts of hydroquinone are charged to a 2-liter reactor, stirred and heated to 80° C. to dissolve the acrylamide. A solution of 1.83 parts of methane sulfonic acid dissolved in 1.83 parts of methanol is added. Heat is reduced and the reaction temperature continues to increase to 85–90° C. The temperature is held at 85–90° C. for one hour and 130.2 parts of 2-ethylhexanol are added. The pressure is reduced to 33.8 kPa absolute while the reaction temperature is maintained at 90° C. over a one hour period. Distillate is collected in a dry ice cooled receiver. Temperature and pressure are adjusted to 110° C. and 10.2 kPa over a one hour period and held at 110° C. and 10.2 kPa for 20 minutes while 326 parts of distillate are collected. The vacuum is released and 2041 parts of acetonitrile are slowly added to the hot molten reaction mixture at a rate to dissolve the reaction mass without extreme build-up in viscosity. When dissolution is complete, the mixture is cooled to 60° C. The solids content is about 30 percent. 17.7 parts of 4N potassium hydroxide are added to increase the pH to 9–10. 949 parts of 35% hydrogen peroxide and 123.9 parts of 4N potassium hydroxide are added over a two hour period to maintain a temperature of 60° C. and a pH of 9.0–9.5. The reaction is slightly exothermic and requires some external cooling When the additions are complete, the reaction mixture is stirred at 60° C. for 20 minutes. Acetonitrile is removed by vacuum distillation by slowly reducing the pressure to 10.2 kPa over a one hour period and allowing the temperature to drop to 35° C. To the residual product is added 1200 parts of water and the mixture is stirred rapidly for 10 minutes at 30° C. and 10 2 kPa. The vacuum is released, the stirring is stopped and the resin is allowed to settle for 10 minutes. Water is decanted and a second lot of 1200 parts of water are added. After the same washing procedure is completed and the water is removed, 500 parts of propylene glycol monomethylether are added. Residual water is removed via azeotropic distillation with additional solvent at 30–35° C. and 5.08 kPa. The temperature is raised to 45° C. at 5.08 kPa and the product solution is filtered and cooled to give the epoxy triazine product at 50–60% by weight in propylene glycol monomethylether. The yield of the product is 86%. It has an epoxy equivalent weight of 338, by Fourier Transform $^{13}$C-Nuclear Magnetic Resonance analysis with a JEOL FX-90Q instrument, operated under a pulse delay of 60s., pulse width of 30 micro s., with gated decoupling, sweep width of 6000 Hz., the number of scans being in the range of 300 to 1000, 8 K data points being taken, and the magnetic field being set at 22.5 mHz for $^{13}$C and 89.5 mHz for $^{1}$H.

EXAMPLE 2

This example describes the preparation of an epoxy melamine with more epoxy groups per nucleus than that of Example 1. An unsaturated resin is prepared by the procedure of Example 1 except that the mixed methyl butyl etherified melamine is reacted with 220 parts of acrylamide and 97.5 parts of 2-ethylhexanol. Epoxidation of this material under the same conditions as in Example 1 gives the epoxy melamine resin in 84% yield with an epoxy equivalent weight of 297 by $^{13}$C-NMR.

EXAMPLE 3

This example describes the preparation of an epoxy melamine from a hexamethoxymethylmelamine. An unsaturated resin is prepared from hexamethoxymethyl melamine, 540 parts (1.5 mol), 302 parts of acrylamide (4.125 mol), 147 parts (1.125 mol) of 2-ethylhexanol and 3.45 parts of methanesulfonic acid according to the procedure of Example 1. 100 parts of this resin are dissolved in 233 parts of acetonitrile, and 2.4 parts of 4N NaOH are added. The temperature of the mixture is increased to 60° C. and a mixture of 167 parts of 35% hydrogen peroxide and 31.9 parts of 4N NaOH are added over a 3 hr. period. After addition, a pressure of 33.8 kPa is applied and excess acetonitrile is removed by distillation at 35–40° C. over 1 hr. while pressure is reduced to 10.2 kPa. The resulting resin is washed three times with 200 parts of water and after decantation of the final wash, 130 parts of propylene glycol monomethylether is added to the washed resin. Residual water is removed via azeotropic distillation at 40° C. and 6.8 kPa over a 1.5 hr. period. The product is filtered and cooled to give an epoxy resin solution at 38.5% solids in 87% yield. The resin has an epoxy equivalent weight of 317 based on $^{13}$C-NMR analysis. The resin has a ratio of average weight molecular size to average number molecular size of 1.51, as determined by size exclusion chromatography.

EXAMPLE 4

This example describes the preparation of an epoxy melamine containing mixed alkoxy groups. A reactor equipped with a stirrer, thermometer and condenser is charged with 780 parts (2.0 mols) of hexamethoxymethylmelamine. The reactor is further charged with 366.5 parts (5.0 mols) of acrylamide and 0.18 parts of hydroquinone. The heterogeneous mixture is stirred and heated to 80° C. and 3.67 parts of methane sulfonic acid in 3 67 parts of methanol are added. The temperature is increased to 85° C. and held for 1 hr. The vacuum is released and 260.4 parts (2.0 moles) of 2-ethylhexanol and 148.2 parts (2.0 moles) of n-butanol are charged to the reactor. The pressure is reduced to 50.7 kPa. The temperature is increased to 110° C. and vacuum increased to 16.9 kPa over a 1.5 hour period, while distillate is collected in a dry ice cooled receiver. 340 parts of distillate are collected. The reaction mixture is held at 110° C. and 16.9 kPa for 10 min. and then poured from the reactor and allowed to cool. The unsaturated resin has a double bond equivalent weight of 240 as determined by reaction with excess morpholine followed by acetylation and titration with standardized perchloric acid.

In 2-liter stainless steel reactor equipped with a stirrer, thermometer, reflux condenser, pH electrode and inlet for hydrogen peroxide and potassium hydroxide addition, 200 parts of the unsaturated resin and 466 parts of acetonitrile are combined and stirred until solution is complete. 7.1 parts of 4N potassium hydroxide are added and the mixture is heated to 56° C. 283 parts of 35% hydrogen peroxide and 34.2 parts of 4N potassium hydroxide are added over a 2 hr. period while the temperature is maintained at 60° C. and the pH at 8.4–10.7. After the addition is complete, the reaction mixture is maintained at 60° C. for 20 min. Acetonitrile is removed by vacuum distillation by slowly reducing pressure to 16.9 kPa over a 1 hr. period and allowing the temperature to drop to 30° C. To the residual product, 400 parts of water is added and the mixture stirred rapidly for 10 min. at 30° C. and 10.2 kPa. The vacuum is released and stirring stopped and resin is allowed to settle for 10 min. Water is decanted and the washing procedure is repeated twice. After removal of the final water wash, 250 parts of propylene glycol monomethylether is added. Residual water is removed by azeotropic distillation at 30–35° C. and 6.8 kPa over a 1.5 hr. period. The product solution is filtered and cooled to give the epoxy resin in solution at 41.4% solids. The product is obtained in 85% yield with an epoxy equivalent weight of 356. The mole ratio of the substituents is about 1.73:0.78: 1.01:0.54:1.24 of epoxy:acrylamide 2-ethyl hexoxy: butanoxy:methoxy based on integration of NMR absorption at $\delta$ 169.0, 131.5, 70.5, 67.5 and 55.0 ppm respectively relative to tetramethylsilane as the internal standard.

EXAMPLE 5

This example describes the preparation of an epoxy melamine with a higher epoxy functionality than that of Example 4. The reactor described in Example 4 is charged with 720 parts (1.85 mole) of hexamethoxy methylmelamine, 403 parts (5.5 mole) of acrylamide and 0.2 parts of hydroquinone. The mixture is stirred and heated to 80° C. and 4.03 parts of methanesulfonic acid in 4.0 parts of methanol are added. The reaction temperature is increased to 85° C. and held for 1 hour. 260.4 parts (2.0 mole) of 2-ethylhexanol and 148.2 parts (2.0 mole) of n-butanol are charged to the reactor and a vacuum of 44.0 kPa is applied. The temperature is increased to 110° C. and vacuum to 16.9 kPa over 1.5 hr. while distillate is collected in a dry ice-cooled receiver. The reaction mixture is held at 110° C. and 16.9 kPa for 10 min., poured from the reactor and allowed to cool. 301 parts of distillate are collected. The unsaturated resin has a double bond equivalent weight of 195 with a functionality of 2 98 double bonds per melamine ring as measured by $^{13}$C-NMR.

The 2-liter stainless steel reactor as described in Example 4 is charged with 200 parts of the above unsaturated resin and 466 parts of acetonitrile. The mixture is stirred until solution is complete and 7 1 parts of 4N potassium hydroxide is added. The reaction mixture is heated to 55° C. and 334 parts of 35% hydrogen peroxide and 46.0 parts of 4N potassium hydroxide are added over a 2 hr. period while the reaction temperature is maintained at 60° C. and the pH at 9.1–9.8. After addition, the reaction mixture is maintained at 60° C. for 10 min. Acetonitrile removed at 32° C. and 13.5 kPa by distillation over a 1 hr. period. The residual product is washed three times with 400 part portions of water and dissolved in 350 parts of propylene glycol monomethyl-ether. Residual water is removed by azeotropic distillation at 32–35° C. and 6.8 kPa over a 3.5 hr. period. The product solution is filtered and cooled to give an epoxy resin in 79% yield. The resin has an epoxy equivalent weight of 295.

EXAMPLE 6

This example describes the preparation of a dimerized epoxy melamine. The reactor equipped as in Example 4 is charged with 460.0 parts (1.0 mol) of a mixed methyl butyl etherified methylol melamine, 146.68 parts (2.0 mol) of acrylamide, 47.27 parts (0.4 mol) of 1,6-hexanediol and 0.07 part of hydroquinone. The mixture is stirred and heated to 40° C. and 1.47 parts of methanesulfonic acid is added. The reaction mixture is heated to 80° C. over 30 min. and then a vacuum of 33.8 kPa is applied. Vacuum is increased to 10.2 kPa and the reaction mixture is heated to 90° C. over a 50 min. period while distillate is collected in a dry ice cooled receiver. 108.1 parts of distillate are collected and the reaction mixture is poured from the reactor and allowed to cool.

The unsaturated resin has a double bond equivalent weight of 243.

The 2-liter stainless steel reactor as described in Example 4 is charged with 300.0 parts of the above unsaturated resin and 699.0 parts of acetonitrile and the mixture is stirred until solution is complete. Then 9.4 parts of 4N potassium hydroxide is added and the mixture was heated to 59° C. 35% hydrogen peroxide, 425 parts and 66.1 parts of 4N potassium hydroxide are added over a 2 hr. period while maintaining the temperature at 60° C. and the pH at 7.7–9.7. After addition the reaction mixture is maintained at 60° C. for 10 min. and acetonitrile is removed by vacuum distillation over 1.5 hr. The resin is then washed 2 times with 600 parts of water and dissolved in 500 parts of propylene glycol monomethyl-ether. Residual water is removed via azeotropic distillation at 30° C. and 6.8 kPa and the product solution is filtered and cooled. The epoxy resin is obtained in 78% yield and has an epoxy equivalent weight of 402. The mole ratio of substituents is 2.52:0.90:2.92:2.56 for epoxy:acrylamide:butoxy:methoxy as determined by $^{13}$C NMR.

EXAMPLE 7

This example describes the preparation of an unsaturated epoxy melamine from a mixed methyl butyl etherified methylolmelamine.

About 690 parts (1.5 mol) of a mixed methyl butyl etherified methylolmelamine (melamine:formaldehyde:-methanol:butanol of a ratio of 1:5.5:2.9:2.1), 696 parts (12.0 mol) allyl alcohol, 109.8 parts (1.5 mol) acrylamide and 0.05 parts of hydroquinone are charged to a 2 liter reactor, stirred and heated to 60° C. to dissolve the resin 2.66 parts of methane sulfonic acid are added and mixture is heated to 85° C. The temperature is held at 85–90° C. for 1 hour. The pressure is reduced to 66.2 kPa and the temperature is maintained at 90° C. for 30 min. The pressure is further reduced to 33.1 kPa and the temperature is maintained at 90° C. for 20 minutes. The pressure is reduced to 10.1 kPa and the temperature is maintained at 90° C. for 60 minutes. The vacuum is released and 1.45 ml of 50% aqueous NaOH is added and stirred while cooling the mixture to room temperature 250 grams of the mixture, 583 grams acetonitrile and 103 grams water are charged to a 2 liter reactor and heated to 60° C. 2 grams of 4 N potassium hydroxide are added to increase the pH to 10. 425 grams of 35% hydrogen peroxide and 80 ml of 4N potassium hydroxide are added over a four hour period to maintain a temperature of 60° C. and a pH of 8.0–10.0. The reaction is slightly exothermic and requires some external cooling. Acetonitrile is removed by vacuum distillation by slowly reducing the pressure to 10.1 kPa over a 2 hour period. To the residual product is added 750 parts of water and the mixture is stirred rapidly for 10 minutes at 30° C. Stirring is stopped and resin is allowed to settle for 10 minutes. Water is decanted and a second 750 part charge of water is added. After the same washing procedure is completed and the water is removed, 500 parts of propylene glycol monomethyl ether solvent are added. Residual water is removed via azeotropic distillation with additional solvent at 30–40° C. and 1.69 kPa. The product solution is 60% by weight in propyleneglycol monomethyl ether. The product is obtained in 80% yield and has an epoxy equivalent weight of 214 by $^{13}$C-NMR.

EXAMPLE 8

This example illustrates the preparation of an epoxy benzoguanamine resin. One mole of a fully methylated methylolbenzoguanamine resin is reacted with 2 moles of acrylamide and the product is epoxidized under the same conditions as in Example 1 to provide a polyepoxy benzoguanamine resin.

EXAMPLE 9

This example illustrates the preparation of an epoxy functional glycouril resin. One mole of a fully methylated methylol glycouril resin is reacted with 2 moles of acrylamide and the product is epoxidized to provide an epoxy functional glycouril resin.

The epoxy compositions of the present invention may be formulated into coating, laminating, encapsulating, adhesives, foams, and potting systems by adding any conventional epoxy reactant vehicles such as polyamines, anhydrides, polyols etc. The polyamines include aliphatic amines, such as ethylene diamine, hexamethylene diamine, triamino-nonane, methyl nonane diamine, triethylene tetraamine and iminobispropylamine, cyclic alphatic amines such as menthane diamine and N-amine ethyl piperazine, aromatic amines such as diaminobenzene, 4,4′diamino diphenyl sulfone, 4,4′methylene dianiline, n-phenylenediamine, 4,4′diaminodiphenyl ether, polyether amines such as n-hydroxy ethyl diethylene triamine and N-(2 hydroxy propyl) ethylene diamine, and polyamide amines such as amido polyamines, imidazoline polyamines, dimer acid polyamines and dicyandiamide. Coating systems may be dissolved in solvents such as aliphatic esters and ketones and mixtures thereof and mixtures containing aliphatic hydrocarbons. The solutions can be used at any dilution which is convenient for application of such coating compositions to a substrate. The coating compositions may include conventional aromatic epoxies Preferably the solids of the coating compositions are greater than about 40 weight percent and even more preferably greater than about 55 weight percent. The ratio of the epoxy groups of the crosslinker to the epoxy reactive groups of the vehicle is in the range of about 0.8 to about 2.2. Preferably the ratio is in the range of about 1.0 to about 1.5. The compositions containing epoxy crosslinkers may be cured at room-temperature. When the coating compositions are used as room-temperature drying paints, they are suitable for painting outdoor structures, and heavy machinery and equipment too bulky to be passed through drying ovens.

The coating composition can be modified by the addition of pigments, plasticizers, colorants, dyes, pigment dispersing agents, flow control agents, stabilizers and the like.

EXAMPLE 10

This example describes the preparation of a coating system curable at 5° C. to 90° C. using the epoxy melamine crosslinker prepared in Example 2. The coating system is prepared from 17.9 parts of a condensation product of polyamines with a dimer acid (amine equivalent weight of 150, where the amino number equals 370 to 400 mg KOH/g, viscosity at 40° C. of 2.5–4.0 Pa.s, and a specific gravity at 28° C. of 1.03), 50 parts rutile titanium dioxide and 31 parts the monoethyl ether of ethylene glycol. The mixture is ground together until thoroughly mixed and is then mixed with 1.8 parts of the epoxy triazine crosslinker and 0.07 parts of FLUO-RAD ® 430, a long chain fluorinated fatty acid surfactant sold by 3-M Co. and allowed to stand for 1 hr. 34.6 parts of the epoxy triazine crosslinker and 51.9 parts of ethylene glycol monoethyl ether are blended with the mixture. The composition is coated onto primed phosphate-treated steel panels to provide coatings 50.8 to 58.4 microns thick. The coatings are cured at 45% relative humidity and 26° C. becoming tack free in 1.5 hours by the tack test described in the *Paint Testing Manual* by Gardner and Sword, 13th Ed., page 270. The MEK rub rating is 200 after 24 hours, and the pencil hardness rating is B (Paint Testing Manual page 283). No effect on the coatings was observed after 2000 hours of condensing humidity (ASTM D-2247-68) at 63° C. The coatings have an excellent gloss of 94/80 at 60°/20° (ASTM D-573) which remains undiminished after 6 months exposure in Florida using the Direct Weathering Inland Black Box Unheated Test. This test determines long term UV stability as measured by gloss retention.

I claim:

1. A process for the preparation of a polyglycidamide represented by the formula $Y(R)_m$, wherein Y is a nucleus selected from the group consisting of

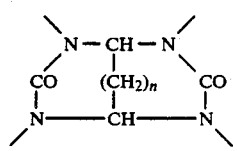

1.

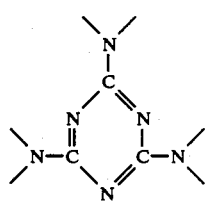

2.

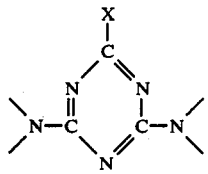

3.

and

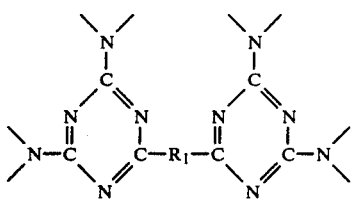

4.

wherein R is selected from the group consisting of:

$(CH_2O)_p R_2$;   A.

$$CH_2N\overset{R_3}{-}COC=CH_2;\quad\underset{R_4}{}$$   B.

-continued

C. 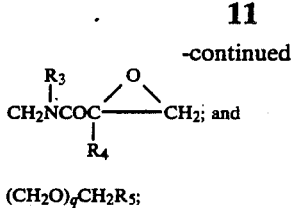

D. $(CH_2O)_qCH_2R_5$;

wherein $R_1$ is a $C_1$ to $C_{10}$, linear or branched or cyclic, saturated or unsaturated or epoxidized, divalent hydrocarbyl radical; wherein $R_2$ is H, or a $C_1$ to $C_{10}$, linear or branched or cyclic, saturated or unsaturated or epoxidized aromatic or aliphatic, monovalent hydrocarbyl radical but not more than one $R_2$ per Y nucleus is H; wherein $R_3$ and $R_4$ are individually selected form hydrogen and methyl; wherein $R_5$ is

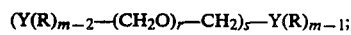

wherein X is $R_2$ as defined hereinabove; wherein m is the equivalence of the Y nucleus and is in the range of 4 to 8; wherein n, p, q and r are individually in the range of 0 to 1; wherein the average s is the range of 0 to 2; wherein the average number of A groups per Y nucleus is in the range of 1 to m−1, the average number of B groups per Y nucleus is in the range of 0 to m−2, the average number of C groups per Y nucleus is in the range of 1 to m−1 and wherein the average number of Y nuclei per molecule is in the range of about 1 to about 4 and the average number of C groups per molecule is in the range of about 1.2 to about 10; wherein the process comprises the epoxidation of the precursor acrylamido composition in which the C groups are

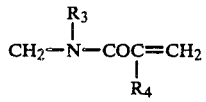

with a nitrile solution of hydrogen peroxide; wherein the hydrogen peroxide is present in an excess of up to 2.5 equivalents per unsaturated group of the precursor acrylamido composition and wherein the equivalent ratio of nitrile to hydrogen peroxide is in the range of about 3 to about 5.

2. The process of claim 1 wherein the excess of hydrogen peroxide is in the range of 2.0 to 2.5 equivalents per unsaturated group of the precursor acrylamido composition.

3. The process of claim 2 wherein the nitrile is acetonitrile.

* * * * *